Nov. 24, 1925.　　　　　　　　　　　　　　1,562,612
R. B. BENJAMIN
ELECTRICAL FIXTURE SUPPORTING DEVICE
Filed May 20, 1921
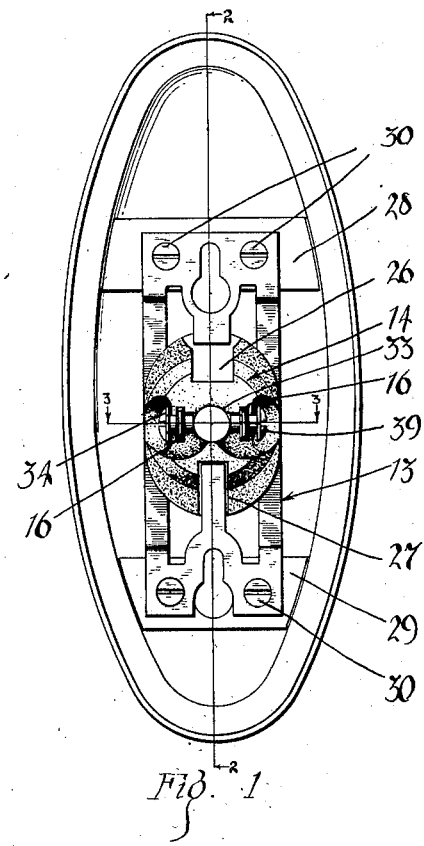
Fig. 1.
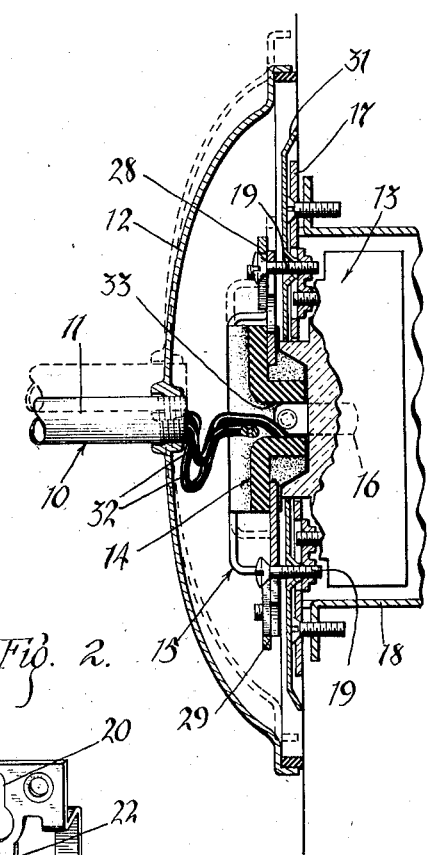
Fig. 2.
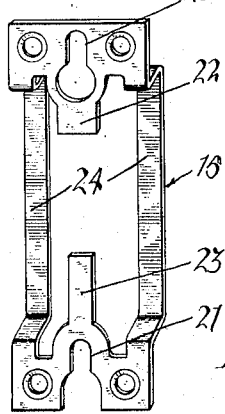
Fig. 4.
Fig. 3.
Inventor:
Reuben B. Benjamin
By
Jones, Addington, Ames & Seibold
Attys.

Patented Nov. 24, 1925.

1,562,612

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRICAL-FIXTURE-SUPPORTING DEVICE.

Application filed May 20, 1921. Serial No. 471,076.

*To all whom it may concern:*

Be it known that I, REUBEN B. BENJAMIN, a citizen of the United States, residing at Chicago, in the county of Cook and State of Illinois, have invented new and useful Improvements in Electrical-Fixture-Supporting Devices, of which the following is a full, clear, concise, and exact description, reference being had to the accompanying drawing, forming a part of this specification.

My invention relates to electrical fixture supporting devices, and connections therefor.

One of the objects of my invention is to provide an improved fixture supporting device in which the fixture can be readily connected and disconnected with respect to the receptacle both electrically and mechanically.

A further object of my invention is to provide such a device which will be simple in construction, cheap to manufacture and durable and efficient in use.

Further objects will appear from the detailed description to follow and from the appended claim.

In the drawings in which an embodiment of my invention is shown—

Fig. 1 is a rear elevational view of a fixture, connecting bracket and plug;

Fig. 2 is a section substantially on the line 2—2 of Fig. 1, showing also a receptacle;

Fig. 3 is a section on the line 3—3 of Fig. 1 the plug however being shown in elevation; and Fig. 4 is a perspective view of the connecting bracket.

The construction shown in the drawings comprises a fixture 10 (the stem 11 and canopy 12 alone being shown) a receptacle 13, a plug-in device 14 for electrically connecting the fixture 10 with the receptacle 13, and a mechanical connecting member or bracket 15 (Fig. 4) for mechanically connecting the fixture with respect to the receptacle.

The plug-in device 14 is carried by the connecting bracket 15, being bodily slidably mounted thereon, to permit the necessary movement of the connecting bracket 15 for making the mechanical connection without interfering with the insertion of the contact blades 16 of the plug-in device 14 into the openings provided therefor in the receptacle 13.

The mechanical connector member 15 is secured to a supporting plate 17 (which may be a sort of cover for the outlet box 18) by means of a pair of screws 19 threaded into the supporting plate 17, which screws engage two key-hole slots 20 and 21 in the supporting bracket 15. The enlarged portions of the key-hole slots are large enough to permit the passage of the heads of the screws 19, the reduced portion of the slots being large enough to receive the shanks of the screws 19, but sufficiently narrow to prevent the bracket 15 from being slipped off over the heads of the screws when in connected position. The connection between the connecting bracket 15 and the supporting plate 17 is effected by two movements, a first movement of the fixture, bracket 15 and plug 14 towards the receptacle 13 to cause the heads of the screws 19 to enter the enlarged portions of the slots 20 and 21, and a second downward movement of the fixture 10, and bracket 15, to cause the narrow part of the key-hole slots 20 and 21 to engage the screws 19.

The sliding connection between the plug-in device 14 and the connecting bracket 15, hereinbefore referred to, permits the downward movement of the connecting bracket 15 without interference from the engagement of the blades 16 in the opening of the receptacle 13. The fixture 10 and connecting bracket 15 are moved downwardly to effect the mechanical connection, but the plug-in device 14 itself remains stationary during this downward movement of the bracket 15, the sliding engagement between the plug-in device and bracket 15 permitting this relative movement. The sliding connection of the plug-in device 14 with the connecting bracket 15 is effected by means of a pair of lugs 22 and 23 formed integral with the bracket 15, and a pair of vertically extending straps 24, the insulating base 25 or the plug-in device 14 being held between the lugs 22 and 23 on the one side, and the straps 24 on the other side. In order to prevent sidewise movement of the plug-in device 14 on the bracket 15, the middle portion of the insulating base 25 is made to extend in between the two vertically extending straps 24 (as shown in Fig. 3) and the insulating base 25 is provided with notches 26 and 27 for engagement with the lugs or tongues 22 and 23.

The connection between the fixture 10 and the connecting bracket 15 is effected by means of a pair of transversely extending straps 28 and 29, the ends of which are secured to the canopy 12 of the fixture, and the intermediate portions of which are secured to the connecting bracket 15 by means of screws 30.

A suitable ornamental finishing plate or escutcheon 31 may be secured in front of the supporting plate 17.

The wires 32 which supply current for the fixture 10, lead from the stem 11 of the fixture 10 through a central opening 33 in the insulating base 25 to the binding screws 34 threaded into the contact blades 16.

For electrically and mechanically connecting the fixture with respect to the receptacle 13, the entire device including the fixture 10, the connecting bracket 15, and the plug-in device 14 is presented in position with respect to the receptacle 13 (using the stem 11 of the fixture as a sort of handle, if desired) the blades 16 being presented in position to enter the openings provided therefor in the receptacle 13, and the bracket 15 being presented in position to bring the enlarged portions of the key-hole openings 20 and 21 opposite the heads of the screws 19. The entire device is then pushed in to cause the blades 16 to enter the recesses in the receptacle 13, and to cause the heads of the screws 19 to pass through the key-hole openings 20 and 21. The fixture 10 and connecting bracket 15 is then shifted bodily downward to cause the shanks of the screws 19 to engage in the narrow portions of the key-hole slots 20 and 21. The plug-in device 14, however, remaining stationary during this downward movement of the fixture 10 and connecting bracket 15.

Having thus described my invention, what I claim as new and desire to secure by Letters Patent of the United States is:—

A mechanical and electrical connector device, comprising a fixture supporting bracket and a plug slidably mounted on said bracket, said bracket being formed of sheet material and having two flat vertical bars lying in a common plane in front of the plug and having cross bars at the top and bottom connecting the vertical bars, and lugs extending toward each other from said cross bars, said plug being slidably mounted between the two vertical bars and the lugs, said cross bars being provided with key-hole slots to receive headed supporting and securing members.

In witness whereof, I have hereunto subscribed my name.

REUBEN B. BENJAMIN.